United States Patent
Lee et al.

(10) Patent No.: US 11,843,471 B2
(45) Date of Patent: Dec. 12, 2023

(54) METHOD AND APPARATUS FOR PROVIDING ONLINE MEETING, CAPABLE OF DETECTING ONLINE MEETING AND BLOCKING DISRUPTION FACTORS

(71) Applicant: SEOUL NATIONAL UNIVERSITY R&DB FOUNDATION, Seoul (KR)

(72) Inventors: Chang-Gun Lee, Seoul (KR); Seonghyeon Park, Seoul (KR); Hyeonseo Yang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 38 days.

(21) Appl. No.: 17/857,542

(22) Filed: Jul. 5, 2022

(65) Prior Publication Data

US 2023/0006848 A1 Jan. 5, 2023

(30) Foreign Application Priority Data

Jul. 5, 2021 (KR) .......................... 10-2021-0088050

(51) Int. Cl.
*H04L 12/18* (2006.01)

(52) U.S. Cl.
CPC ...... *H04L 12/1822* (2013.01); *H04L 12/1818* (2013.01)

(58) Field of Classification Search
CPC .................. H04L 12/1822; H04L 12/1818
See application file for complete search history.

(56) References Cited

U.S. PATENT DOCUMENTS

| | | | |
|---|---|---|---|
| 10,237,280 B2* | 3/2019 | Day | H04L 63/102 |
| 11,636,219 B2* | 4/2023 | Riley | G06F 21/64 |
| | | | 726/26 |
| 2009/0019517 A1* | 1/2009 | Turakhia | G06F 21/6218 |
| | | | 726/1 |

FOREIGN PATENT DOCUMENTS

KR 10-2009-0097111 A 9/2009

* cited by examiner

*Primary Examiner* — Nazia Naoreen
(74) *Attorney, Agent, or Firm* — Paratus Law Group, PLLC

(57) ABSTRACT

A method and apparatus for providing an online meeting, capable of detecting an online meeting and blocking disruption factors are provided. The method includes: detecting execution of a conferencing program for an online meeting on a user terminal; upon detecting execution of the conferencing program, generating a monitoring event to enable a disruption factor blocking function; monitoring packets transmitted and received by the user terminal and an internal process running on the same, in response to the monitoring event; determining whether to allow the transmitted and received packets and the internal process based on a preset blocklist; and blocking the transmitted and received packets or terminating the internal process, based on the determination.

14 Claims, 6 Drawing Sheets

METHOD AND APPARATUS FOR PROVIDING ONLINE MEETING, CAPABLE OF DETECTING ONLINE MEETING AND BLOCKING DISRUPTION FACTORS

CROSS-REFERENCE TO RELATED APPLICATION

This application claims priority to and the benefit of Korean Patent Application No. 10-2021-0088050 filed on Jul. 5, 2021, which is hereby incorporated by reference in its entirety.

BACKGROUND

The present disclosure relates to a method for automatically detecting a process for video conferencing and a method for blocking disruption factors through packet monitoring, and more particularly, to a method for automatically detecting when an online conferencing program starts or when a class or meeting from a remote terminal starts, in order to prevent distractions while a class or meeting is being held through an online conferencing program, a method of registering an unwanted program on a preset blocklist to prevent a user from getting distracted by it during the online meeting, a method of controlling a blocked program from a remote terminal, and a method of transmitting a message and a real-time screen to a remote terminal of an administrator.

The recent COVID-19 pandemic has led to the sharp increase in demand worldwide for non-face-to-face meetings and classes via video conferencing platforms. In line with this, video conferencing platforms have become common also in South Korea as they are used by schools, universities, and private education providers to teach online classes.

Companies embracing remote work have increasingly gone online to hold meetings via video conferencing platforms, and this demand is expected to grow further even after the pandemic recedes, because of the efficiency of video conferencing platforms.

However, one of the issues with using such video conferencing platforms is that it can be hard to stay focused during online meetings as much as during in-person classes and meetings, with distractions such as games, social media, news, communities, and so on. That is to say, these distractions can disrupt focus and concentration in class or productivity at work and therefore lower many students' academic achievements, widening the education gaps and badly affecting the business performance of companies.

Many parents rely on child protection services and content blocking services to deal with this problem, but these can be very strict with children's use of PCs and therefore get them into trouble with their children and do not encourage the children to act on their own initiatives.

PATENT DOCUMENT

Korean Laid-Open Patent No. 10-2009-0097111 (published on Sep. 15, 2009).

SUMMARY

An aspect of the present disclosure is to provide a method for automatically detecting when an online conferencing program starts or when a class or meeting from a remote terminal starts, in order to prevent distractions while a class or meeting is being held through an online conferencing program, a method of registering an unwanted program on a preset blocklist to prevent a user from getting distracted by it during an online meeting, a method of controlling a blocked program from a remote terminal, and a method of transmitting a message and a real-time screen to a remote terminal of an administrator.

Another aspect of the present disclosure is to provide a method and apparatus for providing an online meeting, capable of detecting an online meeting and blocking disruption factors, which can improve focus in online classes and meetings by preventing a user from getting distracted by a variety of disruption factors, and can provide high user satisfaction by avoiding trouble between an actual user and a purchaser.

An exemplary embodiment of the present disclosure provides a method for providing an online meeting, capable of detecting an online meeting and blocking disruption factors, the method including: detecting execution of a conferencing program for an online meeting on a user terminal; upon detecting execution of the conferencing program, generating a monitoring event to enable a disruption factor blocking function; monitoring packets transmitted and received by the user terminal and an internal process running on the same, in response to the monitoring event; determining whether to allow the transmitted and received packets and the internal process based on a preset blocklist; and blocking the transmitted and received packets or terminating the internal process, based on the determination.

The detecting may include: receiving a list of conferencing programs from the user terminal or an administrator terminal and storing the same; and detecting execution of a particular conferencing program included in the list.

The generating may include, upon initial detection of execution of the conferencing program on the administrator terminal, sending the monitoring event to at least one user terminal participating in the online meeting.

The generating may include sending an administrator's blocklist set up by the administrator terminal to the at least one user terminal, along with the monitoring event.

The monitoring may include receiving and storing logs of the transmitted and received packets and of the internal process from the user terminal.

The monitoring may include: a first detection step for detecting execution of the internal process; a second detection step for detecting execution of a browser; and a third detection step for monitoring the transmitted and received packets, wherein the first to third detection steps are repeatedly performed until the disruption factor blocking function is terminated.

The monitoring may include providing the administrator terminal with a function for remotely monitoring at least one user terminal participating in the online meeting.

The providing may include providing each of the at least one user terminal with a dedicated interface for sharing screens or modifying a blocklist.

The determining may include: providing a dedicated interface for editing a blocklist when limited access is allowed on the user terminal; and updating the blocklist to include a program registered through the dedicated interface.

The determining may include, when there is a user's blocklist set up by the user terminal, replacing the user's blocklist with the administrator's blocklist.

The terminating may include, once the packets are blocked or the internal process is terminated, sending information on the packets or the process to the administrator terminal.

The method may further comprise, upon detecting termination of the conferencing program, generating a disable event for disabling the disruption factor blocking function. Another exemplary embodiment of the present disclosure provides an apparatus for providing an online meeting, capable of detecting an online meeting and blocking disruption factors, the apparatus comprising: a meeting detection part for detecting execution of a conferencing program for an online meeting on a user terminal; an event generation part for, upon detecting execution of the conferencing program, generating a monitoring event to enable a disruption factor blocking function; a monitoring part for monitoring packets transmitted and received by the user terminal and an internal process running on the same, in response to the monitoring event; an access determination part for determining whether to allow the transmitted and received packets and the internal process based on a preset blocklist; and a blocking control part for blocking the transmitted and received packets or terminating the internal process, based on the determination.

The apparatus may further include a remote control part for, when a meeting detection and disruption factor blocking function is running on a first user terminal, providing a second user terminal, which is registered in relation to the first user terminal, with a remote control function in regard to the meeting detection and disruption factor blocking function.

The disclosed technology may have the following effects. However, it does not mean that a specific embodiment embraces all the effects suggested in the present disclosure or embraces only such effects, and therefore, it should be understood that the right scope of the disclosed technology is not limited thereto.

A method and apparatus for providing an online meeting, capable of detecting an online meeting and blocking disruption factors, according to an embodiment of the present disclosure can automatically detect when an online conferencing program starts or when a class or meeting from a remote terminal starts, in order to prevent distractions while a class or meeting is being held through an online conferencing program, can register an unwanted program on a preset blocklist to prevent a user from getting distracted by it during an online meeting, can control a blocking program from a remote terminal, and can transmit a message and a real-time screen.

A method and apparatus for providing an online meeting capable of detecting an online meeting and blocking disruption factors according to an exemplary embodiment of the present disclosure provides can improve focus in online classes and meetings by preventing a user from getting distracted by a variety of disruption factors, and can provide high user satisfaction by avoiding trouble between an actual user and a purchaser.

DETAILED DESCRIPTION

The description of the present disclosure is merely an example for structural or functional explanation, and the scope of the present disclosure should not be construed as being limited to the embodiments set forth herein. That is, the embodiments are to be construed as being variously embodied and having various forms, so that the scope of the present invention should be understood to include equivalents capable of realizing technical ideas. Also, the purpose or effect of the present invention should not be construed as limiting the scope of the present invention, since it does not mean that a specific embodiment should include all or only such effect.

Meanwhile, the meaning of the terms described in the present application should be understood as follows.

The terms "first","second", and the like are intended to distinguish one element from another, and the scope of the right should not be limited by these terms. For example, the first component may be referred to as a second component, and similarly, the second component may also be referred to as a first component.

When one element is described as being "connected" to another element, it shall be construed as being connected or accessed to another element directly but also as possibly having yet another element in between. On the other hand, if one element is described as being "directly connected" to another element, it shall be construed that there is no other element in between. This is also true of other expressions for explaining a relationship between elements, i.e., "between" and "directly between" or "adjacent to" and "directly adjacent to".

Unless clearly used otherwise, expressions in the singular number include a plural meaning. In the present description, an expression such as "comprising", "including", or "having" is intended to designate a characteristic, a number, a step, an operation, an element, a part or combinations thereof, and shall not be construed to preclude any presence or possibility of one or more other characteristics, numbers, steps, operations, elements, parts or combinations thereof.

Identification codes (e.g., a, b, and c) of each step are merely used for better comprehension and ease of description, not indicating a specific order of the steps, and the steps may be performed in a different order from a described order, unless clearly limited otherwise. Specifically, the steps may be performed in the same order as the described order, may substantially simultaneously be performed, or may be performed in the reverse order.

The present disclosure may be embodied as computer-readable code in a computer readable recording medium, and the computer-readable recording medium may include all kinds of recording devices for storing data that is readable by a computer system. Examples of the computer-readable recording medium include a ROM, a RAM, a CD-ROM, a magnetic tape, a floppy disk, an optical data storage device, and the like. Further, the computer-readable recording medium may be distributed to a computer system connected via a network and thus store and execute computer-readable code in a distributed manner Unless otherwise defined, all terms used herein have the same meaning as how they are generally understood by those of ordinary skill in the art to which the disclosure pertains. Any term that is defined in a general dictionary shall be construed to have the same meaning in the context of the relevant art, and, unless otherwise defined explicitly, shall not be interpreted to have an idealistic or excessively formalistic meaning.

Figure 1A:
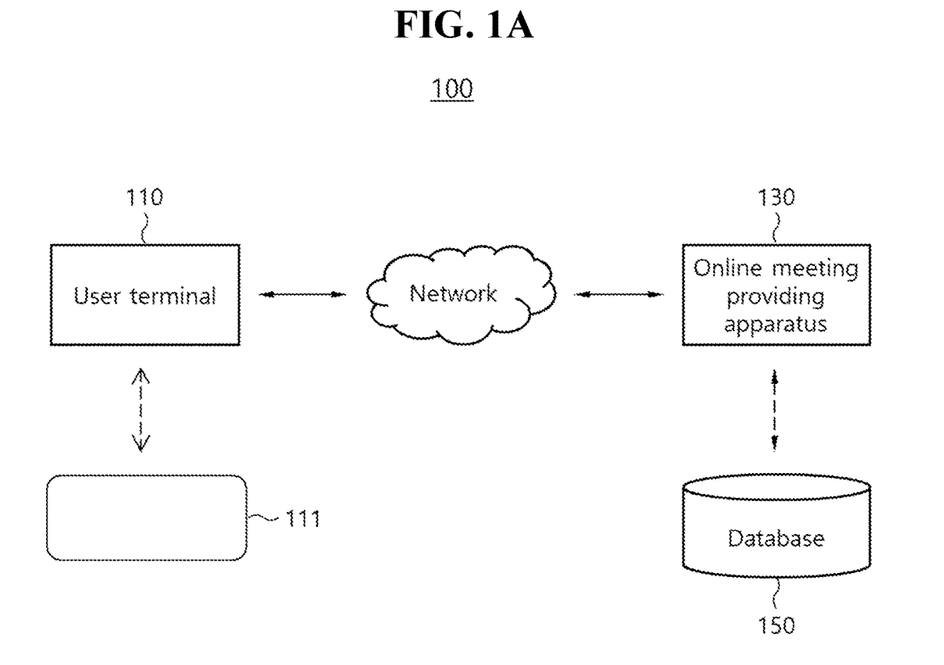
FIGS. 1A and 1B are views depicting an online meeting system according to the present disclosure.
Figure 1B:
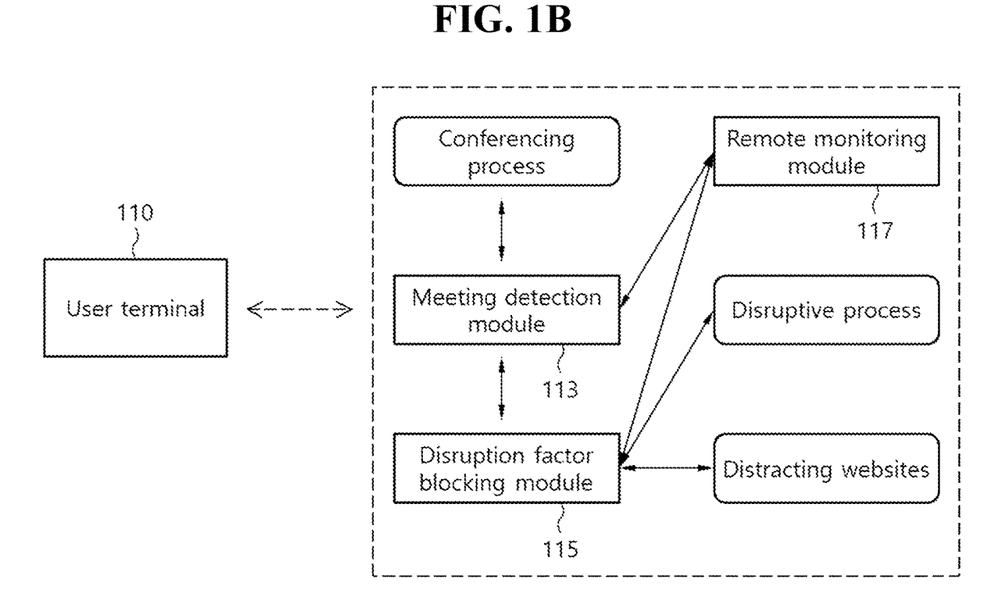

FIGS. 1A and 1B are views depicting an online meeting system according to the present disclosure.

Referring to FIG. 1A, the online meeting system may include a user terminal 110, an online meeting providing apparatus 130, and a database 150.

The user terminal 110 is a device that constitutes the online meeting system 100, and may correspond to a computing device capable of executing a conferencing program 111 to participate in an online video conference. The user terminal 110 may be implemented as, but not limited to, a smartphone, laptop, or computer which can operate by connecting to the online meeting providing apparatus 130, and may be implemented as various devices such as a tablet PC.

Moreover, a dedicated program or application may be installed and run on the user terminal 110 to interact with the online meeting providing apparatus 130. For example, a conferencing program 111 may be installed and run on the user terminal 110. Here, the conferencing program 111 may be implemented as software that provides video conference tools for participating in an online video conference and communicating with various participants. The conferencing program 111 may include a process-driven program, an online conferencing program including a browser-based streaming service, and a conferencing process.

Moreover, the user terminal 110 may be implemented basically by including a camera, a speaker, and a microphone to make participating in an online meeting efficient. The user terminal 110 may include an administrator terminal directly involved in hosting an online meeting, a participant terminal which merely participates in that online meeting, and a parent or guardian terminal which is responsible for the management and supervision of an under-aged participant in the online meeting.

In addition, the user terminal 110 may manage access and use rights for each user individually through the conferencing program 111. For example, if a user participating in an online meeting is under-aged, the user may gain rights of use regarding joining or leaving the online meeting only within a general scope of use provided by the conferencing program 111. A parent of the under-aged user may gain access to a blocklist to block inappropriate programs from running within a limited scope of use. An administrator who holds a particular online meeting may gain rights to share screens in order to monitor participants in the online meeting or to edit the blocklist in order to manage disruption factors.

The online meeting providing apparatus 130 may be implemented as a server which is a computer or program capable of detecting and eliminating factors disrupting the progress of an online meeting by detecting start of the online meeting and monitoring how the online meeting is run. Also, the online meeting providing apparatus 130 may be connected to the user terminal 110 through a wireless network such as wires, Bluetooth, and WiFi, and send and receive data to and from the user terminal 110 via the network.

Although illustrated as being independent from the user terminal 110, the online meeting providing apparatus 130 in FIG. 1A is not limited to this, but may be implemented as a separate module that is included as an element of the user terminal 110 and operates on the user terminal 110. As used herein, the online meeting providing apparatus 130 in FIG. 1A is described as a separate device for convenience of explanation.

In an embodiment, the online meeting providing apparatus 130 may be implemented as including a charging check module. In this case, the online meeting providing apparatus 130 may provide a video conferencing service in response to a service request from the user terminal 110 and ask for payment of a charge for the service. The online meeting providing apparatus 130 may build a variety of charging models and selectively apply them as required.

For example, the online meeting providing apparatus 130 may interact with a video conferencing program running on the user terminal 110, and once the video conferencing program is executed, may perform a login procedure to a user account by displaying a login form. Once user authentication or user login is completed, a charging model may apply to the user and calculate a charge for use of the video conferencing service.

The database 150 may be a storage device that stores various information required in the operation of the online meeting providing apparatus 130. For example, the database 150 may store monitoring logs collected from the user terminal 110 and store information on the online meeting, but not limited thereto, and may store information that is collected or processed in various forms in a process in which the online meeting providing apparatus 130 provides an online meeting while being capable of detecting an online meeting and blocking disruption factors.

Referring to FIG. 1B, the online meeting providing apparatus 130 may perform an operation for detecting execution of the conferencing program 111 on the user terminal 110 and detecting and eliminating disruption factors during an online meeting. To this end, the online meeting providing apparatus 130 may be implemented as including separate modules for performing various functions. For example, in FIG. 1B, the online meeting providing apparatus 130 may include a meeting detection module 113, a disruption factor blocking module 115, and a remote monitoring module 117.

Meanwhile, the online meeting providing apparatus 130 may be included as an element of the user terminal 110, in which case the online meeting providing apparatus 130 may be implemented by separate modules and, in some embodiments, may independently perform some of the functions of the conferencing program 111. It should be noted that logical design changes may be made to the components of the online meeting providing apparatus 130 within the scope of ordinary creative activity of a person skilled in the art.

The meeting detection module 113 may detect execution of the conferencing program 111 on the user terminal 110. The meeting detection module 113 may monitor an internal process running on the user terminal 110 and check process handling information generated from an execution process of a program to determine whether the program is the conferencing program 111 or not. In this case, the meeting detection module 113 may determine whether the program is the conferencing program or not, based on a list of preregistered programs.

For example, a program list may be generated in advance by an administrator or a user, and the programs in the list may include video conferencing programs such as Zoom, Google Classroom, Google Meet, Cisco WebEx, and MS Teams. Upon detecting execution of a conferencing program registered on the user terminal 110, the meeting detection module 113 may generate identification information on the user terminal 110 and the conferencing program, along with a detection signal.

Meanwhile, the meeting detection module 113 may be included in the online meeting providing apparatus 130, but not limited thereto, and may be implemented as an element of the user terminal 110. In this case, the meeting detection module 113 may be connected to the online meeting providing apparatus 130 and send information on a meeting detection operation.

Upon detecting execution of a conferencing program, the disruption factor blocking module 115 may detect and eliminate factors that can disrupt focus and concentration during an online meeting. More specifically, the disruption factor blocking module 115 may monitor packets being received on the user terminal 110 or processes running on it, and, upon detecting a packet or process listed on a preset blocklist, may block the packet or terminate the process. In this case, the blocklist may include a list of remote addresses for specific packets or a list of processes.

Meanwhile, the disruption factor blocking module 115 may be included in the online meeting providing apparatus 130, but not limited thereto, and may be implemented as an element of the user terminal 110. In this case, the disruption factor blocking module 115 may be connected to the online meeting providing apparatus 130 and send information on a disruption factor blocking operation.

The remote monitoring module 117 may provide remote monitoring information during an online meeting between user terminal 110. For example, the remote monitoring module 117 may run on the user terminal 110 where the conferencing program 111 is executed, and may send real-time videos of meeting participants or information on the participants to the dedicated online meeting providing apparatus 130 or an administrator terminal hosting the online meeting.

Moreover, the remote monitoring module 117 may send various information generated from the terminals of the participants during the online meeting, and provide dedicated online meeting management functions to the administrator of the online meeting. For example, when necessary during the online meeting, the administrator of the online meeting may reset and adjust blocking settings for all participants, as to whether to unblock a certain program. The remote monitoring module 117 may send and receive information to and from the disruption factor blocking module 115, and when the online meeting is ended, may restore the configuration of the disruption factor blocking module 115 so that it goes back to the same settings as before the online meeting.

Figure 2:
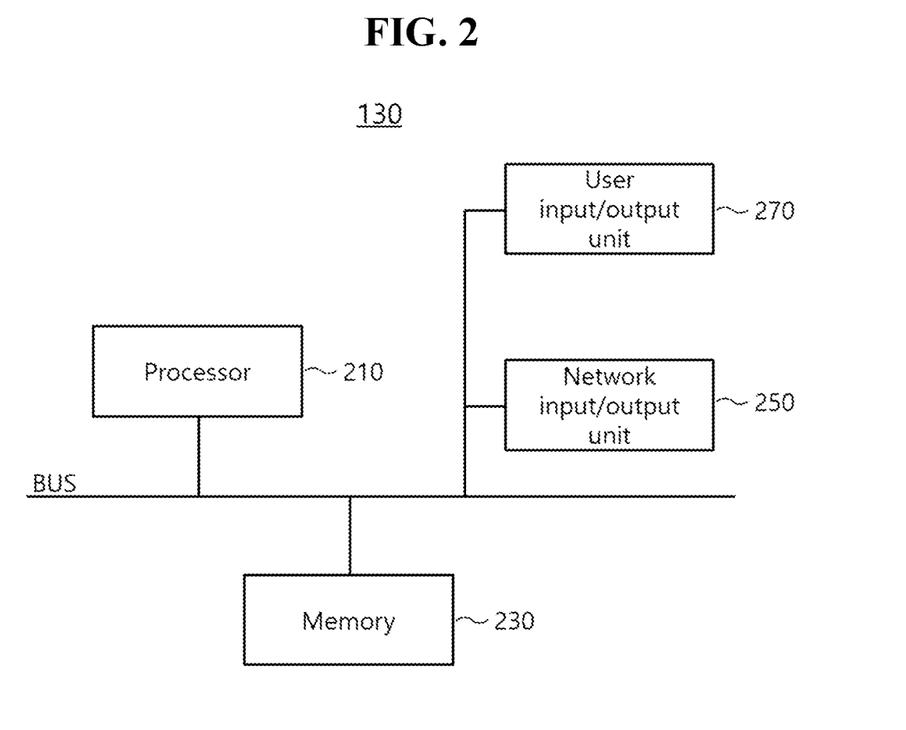
FIG. 2 is a view depicting a system configuration of an online meeting providing apparatus of FIG. 1A.

FIG. 2 is a view depicting a system configuration of an online meeting providing apparatus of FIG. 1A.

Referring to FIG. 2, the online meeting providing apparatus 130 may be implemented by including a processor 210, a memory 230, a user input/output unit 250, and a network input/output unit 270.

The processor 210 may execute a procedure for processing the steps of an operation process of the online meeting providing apparatus 130, manage the memory 230 which is read or written throughout the process, and schedule synchronization between volatile memory and non-volatile memory which are in the memory 230. The processor 210 may control the overall operation of the online meeting providing apparatus 130, and may be electrically connected to the memory 230, the user input/output unit 250, and the network input/output unit 270 and control data flow between them. The processor 210 may be implemented as a central processing unit (CPU) of the online meeting providing apparatus 130.

The memory 230 may include an auxiliary storage device which is implemented as non-volatile memory such as solid-state drive (SSD) or hard disk drive (HDD) and used to store all data required for the online meeting providing apparatus 130, and a main storage device which is implemented as volatile memory such as random access memory (RAM).

The user input/output unit 250 may include an environment for receiving user input and an environment for outputting particular information to the user. For example, the user input/output unit 250 may include an input device including an adaptor, such as a touchpad, a touchscreen, an on-screen keyboard, or a pointing device, and an output device including an adaptor, such as a monitor or a touchscreen. In an embodiment, the user input/output unit 250 may correspond to a computing device which is connected through remote access, in which case the online meeting providing apparatus 130 may serve as a separate server.

The network input/output unit 270 may include an environment for connecting to an external device or system over a network—for example, an adaptor for communication on a local area network (LAN), a metropolitan area network (MAN), a wide area network (WAN), and a value-added network (VAN).

Figure 3:
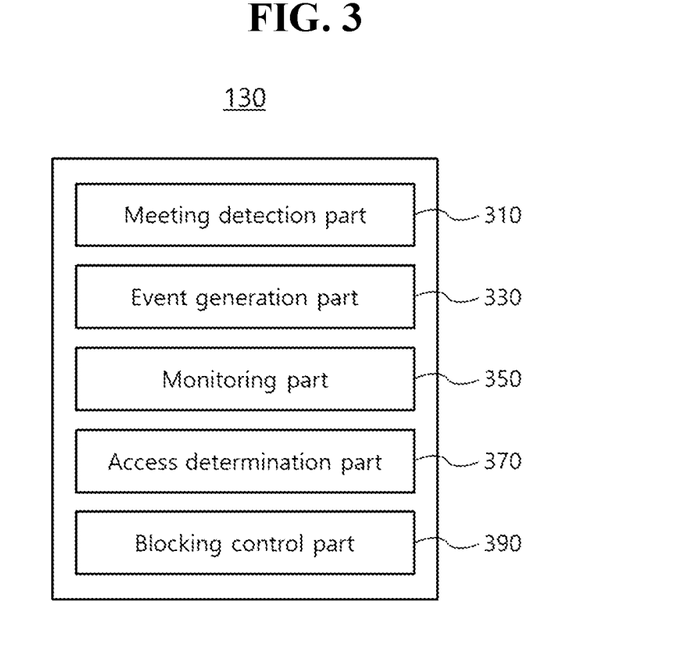
FIG. 3 is a view depicting a function configuration of the online meeting providing apparatus of FIG. 1A.

FIG. 3 is a view depicting a function configuration of the online meeting providing apparatus of FIG. 1A.

Referring to FIG. 3, the online meeting providing apparatus 130 may include a meeting detection part 310, an event generation part 330, a monitoring part 350, an access determination part 370, blocking control part 390, and a remote control processing part (not shown in FIG. 3), and a control part (not shown in FIG. 3).

The meeting detection part 310 may detect execution of a conferencing program for an online meeting on the user terminal 110. The meeting detection part 310 may correspond to the meeting detection module 113 running on the user terminal 110. The meeting detection part 310 may detect whether a conferencing program is executed, by searching for a conferencing process by looking up a list of processes, by searching for a conferencing process by looking up information on an internal process running on a multiprocess-based browser, or by locating remote IP addresses sequentially through packet monitoring.

In an embodiment, the meeting detection part 310 may receive and store a list of conferencing programs from the user terminal 110 or the administrator terminal, and detect execution of a particular conferencing program included in the conferencing program list. That is, the user may make a list of conferencing programs to be detected, and enter it as setting data. In this way, a list of conference programs may be set up for each user. The conferencing program list may be stored and saved on the user terminal 110, or may be collected by the online meeting providing apparatus 130 and stored in the database 150.

The meeting detection part 310 may detect whether a conferencing program is executed or not, based on a conferencing program list related to the user terminal 110 or the user's account, and upon detecting execution of the conferencing program, may generate identification information on the conferencing program and the user terminal 110, along with a detection signal, and send it to the online meeting providing apparatus 130.

Upon detecting execution of the conferencing program, the event generation part 330 may generate a monitoring event to enable a disruption factor blocking function. The online meeting providing apparatus 130 may generate a monitoring event by the event generation part 330, and the generated monitoring event may be sent to the user terminal 110 over a network. That is, the user terminal 110 may enable the disruption factor blocking function from the time of receipt of the monitoring event, and the disruption factor blocking function may be kept turned on until the online meeting ends.

In an embodiment, upon initial detection of execution of the conferencing program on the administrator terminal, the event generation part 330 may send the monitoring event to at least one user terminal 110 participating in the online meeting. An online meeting may be generated and initiated by the administrator, and once the online meeting is generated, the online meeting may begin as participants involved in the online meeting join. The event generation part 330 may send a monitoring event to the user terminals 110 participating in the online meeting to force the user terminals 110 to enable the disruption factor blocking function. On the other hand, in the event that the user terminal 110 is running a disruption factor blocking function on its own, the monitoring event may be transmitted directly to the disruption factor blocking module along an internal event transmission path.

In an embodiment, the event generation part 330 may send an administrator's blocklist set up by the administrator terminal to the at least one user terminal 110, along with the monitoring event. The online meeting providing apparatus 130 may provide the administrator a full control function during the online meeting, and when the online meeting is initiated by the administrator, may send an administrator's blocklist set up by the administrator, along with a monitoring event for enabling the disruption factor blocking function. Once the administrator's blocklist is sent to the user terminal 110, it applies to a disruption factor blocking operation first before a user's blocklist set up by the user.

In an embodiment, upon detecting termination of the conferencing program, the event generation part 330 may generate a disable event for disabling the disruption factor blocking function. That is, the disruption factor blocking function according to the present disclosure may be automatically enabled when execution of the conferencing program is detected, and may be automatically disabled when the execution of the conferencing program is terminated.

The monitoring part 350 may monitor packets transmitted and received by the user terminal 110 and an internal process running on it, in response to the monitoring event. The monitoring part 350 may correspond to a disruption factor blocking module running on the user terminal 110. In an embodiment, the monitoring part 350 may receive and store logs of the transmitted and received packets and of the internal process from the user terminal 110. The monitoring part 350 may collect packet and process information from each of the user terminals 110 participating in the online meeting, and may store and manage the packet and process information for each user in the database 150.

In an embodiment, the monitoring part 350 may repeatedly perform a plurality of detection steps until the disruption factor blocking function is terminated. Here, the plurality of detection steps may include a first detection step for detecting execution of the internal process, a second detection step for detecting execution of a browser, and a third detection step for monitoring the transmitted and received packets. The monitoring part 350 may monitor execution of a program by detecting execution of an internal process, as well as managing programs running on the user terminal 110. Moreover, the monitoring part 350 may look up information on an internal process running on a browser and monitor URL information of websites the browser accesses. In addition, the monitoring part 350 may monitor source IP addresses of transmitted and received packets by checking these packets.

In an embodiment, the monitoring part 350 may provide the administrator terminal with a function for remotely monitoring at least one user terminal 110 participating in the online meeting. The monitoring part 350 may provide the administrator hosting the online meeting and each of general participants with their own monitoring function. For example, the administrator may have its own monitoring function to monitor the general participants in the online meeting so that the administrator has full control over them. To this end, remote monitoring modules may be executed and operate separately on the administrator terminal and the user terminal, and once the online meeting begins, data may be sent and received between the remote monitoring modules as they interact with each other.

In an embodiment, the monitoring part 350 may provide each of the at least one user terminal 110 with a dedicated interface for sharing screens or modifying a blocklist. The monitoring part 350 may provide each user terminal 110 with monitoring information, and the monitoring information may include screen image information and blocklist information. Through the monitoring information, each user may view screens they share with other users participating in the online meeting, and check information on blocked programs or websites.

Meanwhile, the monitoring part 350 may provide the administrator terminal with a dedicated interface for sharing screens with entire users and modifying their blocklists. That is, the general participants in the online meeting may have identical interfaces, whereas the administrator may have their own dedicated interface through which the administrator has full control over the entire online meeting, unlike the general participants. Accordingly, the administrator may temporally use a particular program during the online meeting, or may be temporarily allowed access to a particular website.

The access determination part 370 may determine whether to allow the transmitted and received packets and the internal process based on a preset blocklist. The access determination part 370 may correspond to the disruption factor blocking module running on the user terminal 110. For example, the access determination part 370 may check URL information by looking up information on the internal process and then determine whether to allow the internal process or not by comparing it to a blocklist of websites. The access determination part 370 may check a source IP address of each packet through packet monitoring and then determine whether to allow it by comparing it to a blocklist of IPs.

In an embodiment, the access determination part 370 may provide a dedicated interface for editing a blocklist when limited access is allowed on the user terminal 110, and then update the blocklist to include a program registered through the dedicated interface. For example, when an under-aged child uses a conferencing program on their user terminal 110, a parent of the under-aged child may access a dedicated interface provided by the access determination part 370 through authentication. That is, the parent may set up a blocklist, and this blocklist may apply first when the under-aged child uses the conferencing program. In this way, the parent is able to efficiently manage their child's engagement in the online meeting.

Meanwhile, the dedicated interface may provide a convenient function for easily adding an unwanted program to a blocklist. For example, the dedicated interface may provide a function for adding an unwanted program by drag and drop, and provide a function for finding, specifying, and adding an unwanted program through a file search function. Meanwhile, the dedicated interface is not limited to the above examples, but may provide diverse functions for adding programs.

In an embodiment, when there is a user's blocklist set up by the user terminal 110, the access determination part 370 may replace the user's blocklist with the administrator's blocklist. That is, when the administrator hosts an online meeting and participants join it, a blocklist set up by the administrator may be sent to the terminals of the participants. At this time, the administrator's blocklist may apply first before the user's blocklist which is set up individually on each user terminal. Accordingly, the administrator is able to apply the block settings they enter to all participants at a time as they host the online meeting, and this will help the administrator run and organize the online meeting effectively.

The blocking control part 390 may block the transmitted and received packets or terminate the internal process, based on whether they are allowed or not, which is determined by the access determination part 370. The blocking control part 390 may terminate execution of a program in a blocklist by monitoring process information, and may block packets with IP addresses in the blocklist by monitoring the source IP addresses of the packets.

In an embodiment, once the packets are blocked or the internal process is terminated, the blocking control part 390 may send information on the packets or the process to the administrator terminal. The blocking control part 390 may collect information on a blocking or terminating operation and store it in the database 150, and may collect information on a blocking or terminating operation on each user terminal 110 and send it to the administrator hosting the online meeting. As a result, the administrator is able to check how well the participants as a whole stay focused on the online meeting, as well as each individual user's engagement in the online meeting, based on information collected during the online meeting.

That is, the online meeting providing apparatus 130 may provide statistics on the online meeting to the administrator terminal and the user terminals of the general participants. Especially, the administrator may be visually presented with information on the entire participants' engagement in the online meeting, combined with various statistical information, through various graphical interfaces.

In an embodiment, when a packet is blocked or a process is terminated, if the user is under-aged, the blocking control part 390 may send information on that packet or that process to a registered parent's or guardian's terminal. For an under-aged user, the blocking control part 390 may assist the parent or the guardian in teaching the child by informing them about the child's inappropriate use of content.

Meanwhile, for an internal process that is allowed only to a limited extent, the blocking control unit 390 may handle a blocking operation for that internal process in various ways. For example, a disruption factor blocking function may be applied to the internal process, by completely terminating the process or restricting the execution of the process depending on the extent of access the internal process is allowed. Accordingly, the blocking control part 390 may forcefully terminate a program related to the internal process, or may forcefully minimize, if not terminate, the program or ban a particular function or operation of the program.

Moreover, the blocking control part 390 may block websites in various ways through packet monitoring. For example, the blocking control part 390 may restrict or block a user from accessing websites by blocking packets, changing the hosts file, controlling firewalls, and so on, and may use various methods selectively or in parallel.

When a meeting detection and disruption factor blocking function is running on a first user terminal, the remote control processing part (not shown in FIG. 3) may provide a second user terminal, which is registered in relation to the first user terminal, with a remote control function in regard to the meeting detection and disruption factor blocking function. For example, assuming that a user of the first user terminal is under-aged, the second user terminal may correspond to a terminal used by a parent or guardian of the under-aged user. That is, the meeting detection and disruption factor blocking functions according to the present disclosure may be implemented as one application and run on the first user terminal.

Moreover, the same application may be run on the parent's or guardian's terminal. When limited access is allowed for the parent's or guardian's account or the like, a remote control function for remotely controlling an application running on the first user terminal. For example, when limited access is allowed on the parent's or guardian's terminal, it may be provided with a dedicated interface for editing a blocklist related to the first user terminal. The parent or the guardian may execute operations such as adding, modifying, and deleting programs on the blocklist through a dedicated interface. At the same time, the parent or the guardian may remotely monitor various activities on the first user terminal through their terminal.

The control part (not shown in FIG. 3) may control the overall operation of the online meeting providing apparatus 130 and manage control flows or data flows between the meeting detection part 310, the event generation part 330, the monitoring part 350, the access determination part 370, and the blocking control part 390.

Figure 4:
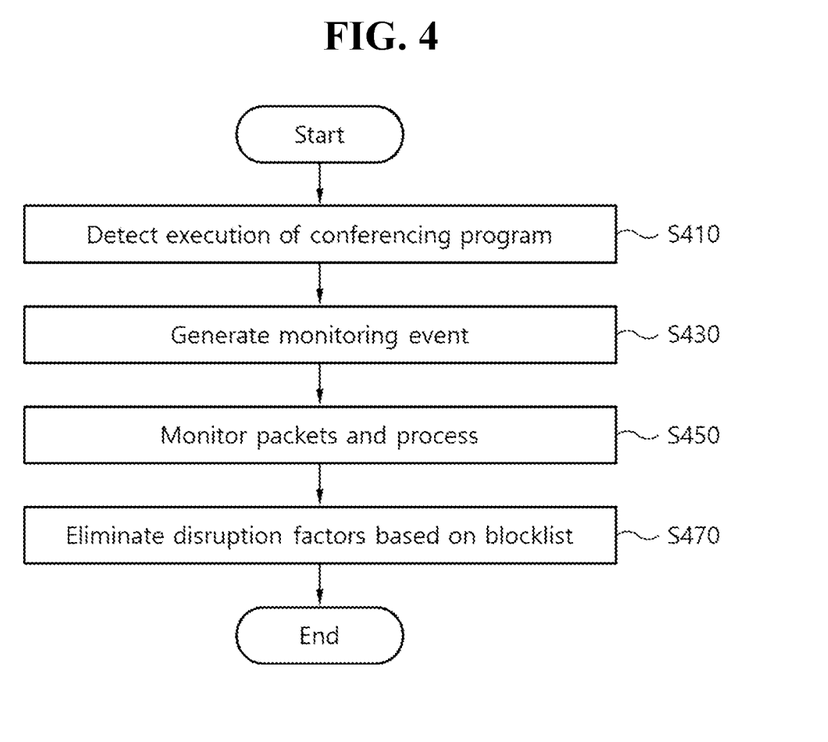
FIG. 4 is a flowchart depicting a method for providing an online meeting, capable of detecting an online meeting and blocking disruption factors.

FIG. 4 is a flowchart depicting a method for providing an online meeting, capable of detecting an online meeting and blocking disruption factors.

Referring to FIG. 4, the online meeting providing apparatus 130 may detect execution of a conferencing program for video conferencing on the user terminal 110 (S410). While the method for providing an online meeting, capable of detecting an online meeting and blocking disruption factors, according to the present disclosure is described as being applied to a conferencing program running on a user terminal, the method is not limited thereto but is also universally applicable to a dedicated program or dedicated interface provided by a private education provider, an online learning site, etc.

Moreover, upon detecting execution of a conferencing program by the event generation part 330, the online meeting providing apparatus 130 may generate a monitoring event to enable a disruption factor blocking function (Step S430).

In addition, the online meeting providing apparatus 130 may monitor packets transmitted and received by the user terminal 110 and an internal process running on it, in response to an enable event, by the monitoring part 350 (Step S450). The online meeting providing apparatus 130 may determine whether to allow the transmitted and received packets and the internal process based on a preset blocklist, by the access determination part 370, and may block the transmitted and received packets or terminate the internal process depending on whether they are allowed or not, by the blocking control part 390 (Step S470).

Figure 5:
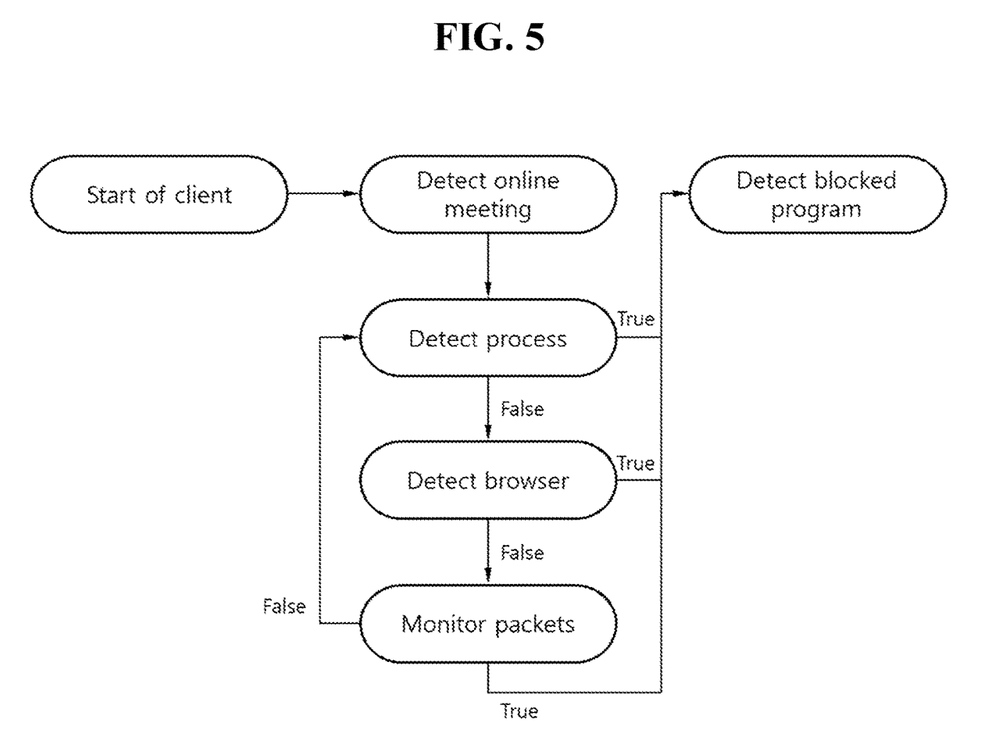
FIGS. 5 and 6 are views depicting an embodiment of a process for blocking disruption factors according to the present disclosure.
Figure 6:
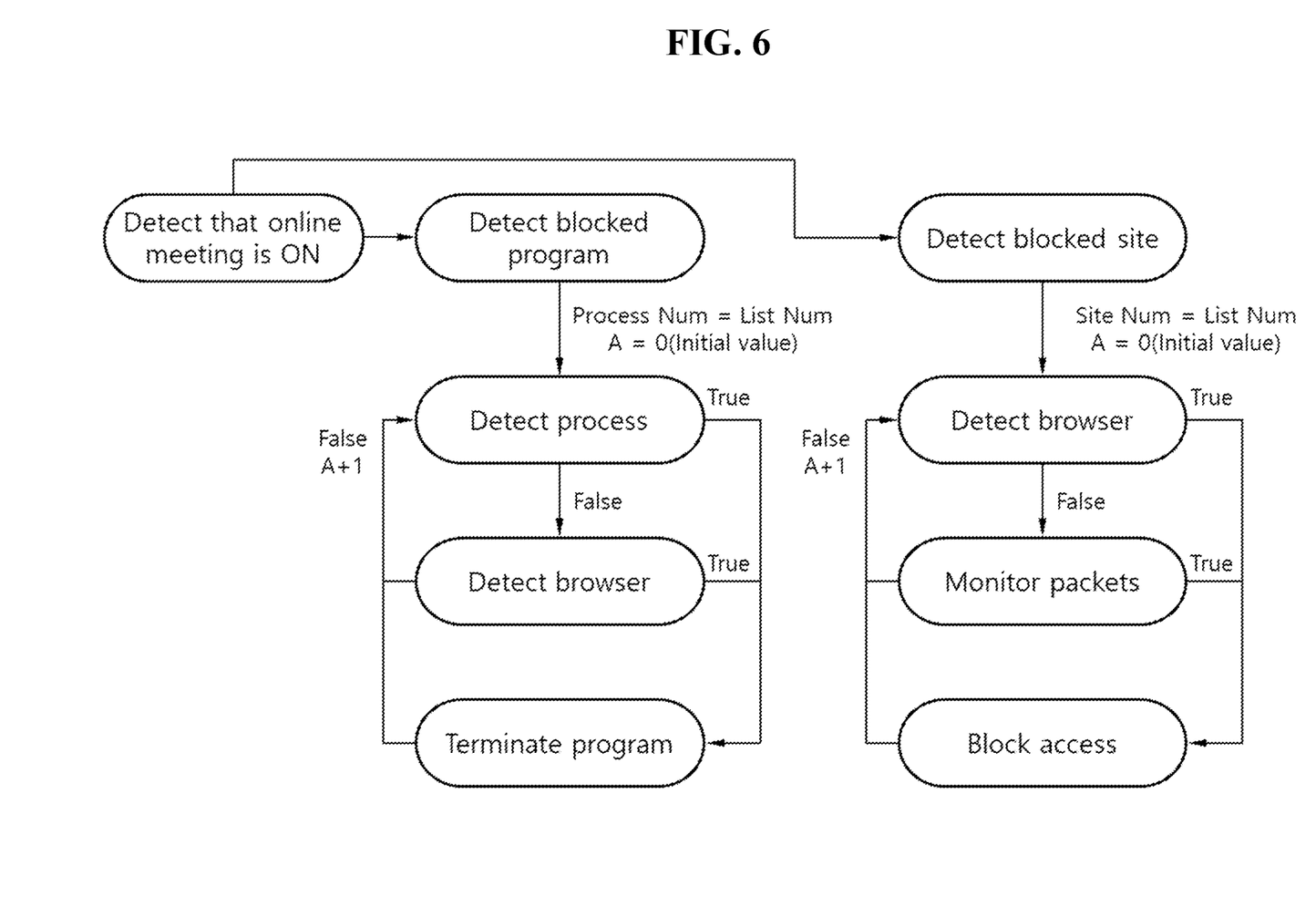

FIGS. 5 and 6 are views depicting an embodiment of a process for blocking disruption factors according to the present disclosure.

Referring to FIG. 5, the online meeting providing apparatus 130 may detect execution of a conferencing program 111 on the user terminal 110 by the meeting detection module 113. More specifically, the meeting detection module 113 may be executed for each timer event from the start (or execution) of a client, and an event value may be sent to the disruption factor blocking module 115 when an online conferencing process is detected through a sequence of steps of detecting a process, detecting a browser, and monitoring packets.

Referring to FIG. 6, the online meeting providing apparatus 130 may trigger the disruption factor blocking module 115 to start operating in response to an event signal which the meeting detection module 113 sends upon detecting start of an online meeting. The disruption factor blocking module 115 may perform an operation for detecting a blocked program and an operation for detecting a blocked site, individually.

More specifically, the operation for detecting a blocked program may start from an operation of setting a Process Num variable to the number of blocklists (List Num) and resetting a count variable A for counting the number of repetitions to zero. Afterwards, process detection and browser detection may be sequentially performed, and when a blocked program is successfully detected based on a blocklist, the execution of the blocked program may be terminated. If the detection of the blocked program based on the blocklist fails, the count variable A is increased by 1, and then the detection operation may be repeatedly performed. The detection operation may continue until the count variable A is increased to Process Num.

Moreover, the operation for detecting a blocked site may start from an operation of setting a Site Num variable to the number of blocklists (List Num) and resetting a count variable A for counting the number of repetitions to zero. Afterwards, browser detection and packet monitoring may be sequentially performed, and when a packet is successfully detected based on a blocklist, access from the source IP of the packet may be blocked. If the detection of the packet based on the blocklist fails, the count variable A may be increased by 1, and then the detection operation may be repeatedly performed. The detection operation may continue until the count variable A is increased to Site Num.

Figure 7A:
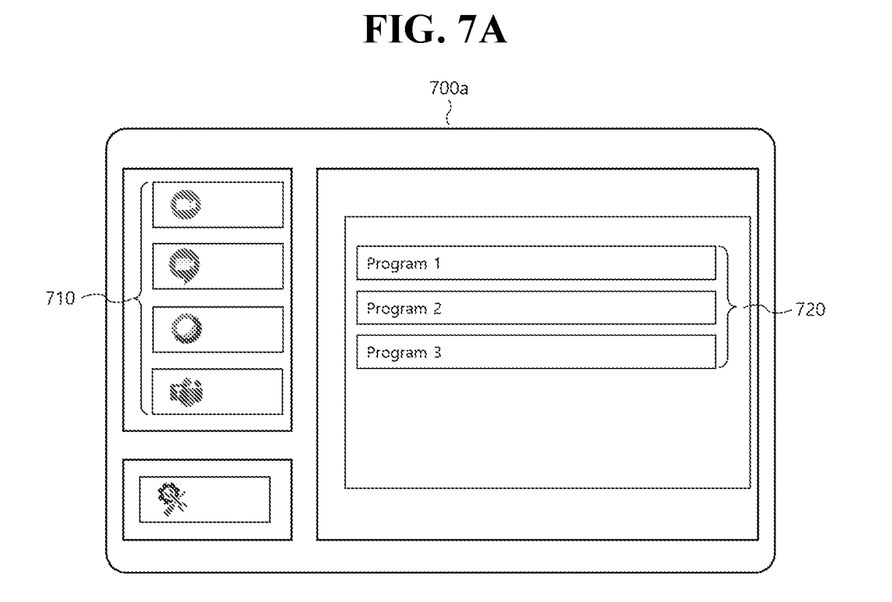
FIGS. 7A and 7B are views depicting an interface provided by an online meeting providing apparatus according to the present disclosure.
Figure 7B:
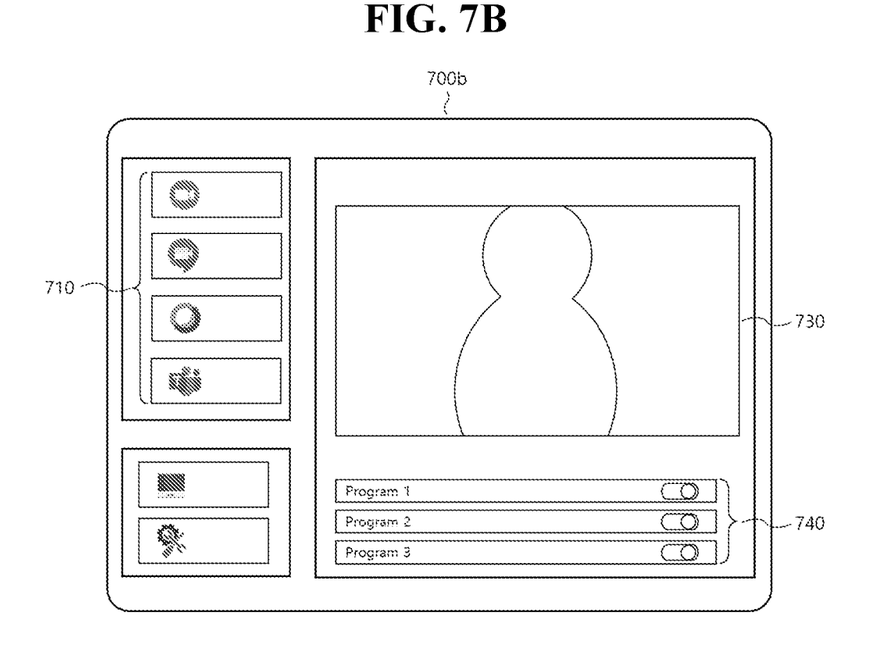

FIGS. 7A and 7B are views depicting an interface provided by an online meeting providing apparatus 130 according to the present disclosure.

Referring to FIG. 7A, the online meeting providing apparatus 130 may detect execution of a video conferencing program on the user terminal 110. In this case, the online meeting providing apparatus 130 may detect execution of a video conferencing program based on a list 710 of registered conferencing programs through an online meeting interface 700*a*. Also, the online meeting providing apparatus 130 may eliminate disruption factors on the user terminal 110 during an online meeting based on a list 720 of blocked programs. The list 720 of blocked programs may include a list of programs or a list of websites, and may be preset by the user or the administrator.

Referring to FIG. 7B, the online meeting providing apparatus 130 may provide the administrator terminal with an online meeting interface 700*b* for monitoring an online meeting. The administrator may monitor a remote monitoring screen 730 for a particular user terminal 110 through an online meeting interface 700*b*, and may fully control blocking information for users participating in the online meeting through a list 740 of blocked programs. In this case, the remote monitoring screen 730 may correspond to a camera image of a user participating in the online meeting or a captured image of a computer screen.

Moreover, the online meeting interface 700*b* may display a list of users participating in the online meeting on a monitoring window, and at the same time, may display a remote monitoring screen 730 for each user, along with user information. That is, the remote monitoring screen 730 of each user participating in the online meeting, along with user information (e.g., a photo, name, etc.), may be displayed. In this case, the online meeting interface 700*b* may display a blocklist as well at the bottom of the user list. In an embodiment, the administrator may add a particular program by drag and drop to a particular user's blocklist displayed through the online meeting interface 700*b*. Also, the administrator may delete the added program from the user's blocklist by drag and drop.

Meanwhile, the online meeting interface 700*b* may provide each individual user with the remote monitoring screen 730 and the list 740 of blocked programs during the online meeting, which allows the administrator to manage the remote monitoring screen 730 and the list 740 of blocked programs for each user.

The online meeting providing apparatus 130 according to the present disclosure may perform a method for detecting execution of an online conferencing process and check for the presence of an online conferencing process by searching a list of processes running on a computer.

The online meeting providing apparatus 130 may obtain and check URL information by looking up information on an internal process in a multiprocess-based browser running on the computer. The online meeting providing apparatus 130 may check for the presence of an online conferencing process by searching a list of source IP addresses connected to the computer through packet monitoring. The online meeting providing apparatus 130 may provide an interface where the user is able to add a shortcut file and startup programs as unwanted programs by drag and drop. The online meeting providing apparatus 130 may provide an interface where the user is able to add an executable file as an unwanted program by entering the location of that file.

Moreover, the online meeting providing apparatus 130 may provide an interface where the user is able to add a certain program as an unwanted program by entering its name, locate an executable file of the program, if any, and automatically registering the executable file. The online meeting providing apparatus 130 may perform a step of determining whether to block a program blocked by the administrator by checking process handling information, when the user executes the blocked program on the computer and a step of determining whether to block a particular website blocked by the administrator through packet monitoring when the user accesses the URL of that website through a browser.

The online meeting providing apparatus 130 may perform a step of looking up class/meeting information having matching information between user and school/company, which is registered by a class/meeting administrator, in order to automatically detect a start of a class/meeting, and checking whether the class/meeting administrator has started a class/meeting through an online meeting, and a step of detecting start of a class, informing users involved in the class, and providing a connection to the users.

The online meeting providing apparatus 130 may perform a step of tracking how remotely connected users are doing by receiving information on the connected users and real-time screen snapshots of them, and a step of determining whether to allow the remotely connected users access to disruption factors or block them.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. A method for providing an online meeting, capable of detecting an online meeting and blocking disruption factors, the method comprising:
   detecting execution of a conferencing program for an online meeting on a user terminal;
   upon detecting execution of the conferencing program, generating a monitoring event to enable a disruption factor blocking function;
   monitoring packets transmitted and received by the user terminal and an internal process running on the same, in response to the monitoring event;
   determining whether to allow the transmitted and received packets and the internal process based on a preset blocklist; and
   blocking the transmitted and received packets or terminating the internal process, based on the determination.

2. The method of claim 1, wherein the detecting includes:
   receiving a list of conferencing programs from the user terminal or an administrator terminal and storing the same; and
   detecting execution of a particular conferencing program included in the list.

3. The method of claim 1, wherein the generating includes, upon initial detection of execution of the conferencing program on the administrator terminal, sending the monitoring event to at least one user terminal participating in the online meeting.

4. The method of claim 3, wherein the generating includes sending an administrator's blocklist set up by the administrator terminal to the at least one user terminal, along with the monitoring event.

5. The method of claim 1, wherein the monitoring includes receiving and storing logs of the transmitted and received packets and of the internal process from the user terminal.

6. The method of claim 1, wherein the monitoring includes:
   a first detection step for detecting execution of the internal process;
   a second detection step for detecting execution of a browser; and
   a third detection step for monitoring the transmitted and received packets,
   wherein the first to third detection steps are repeatedly performed until the disruption factor blocking function is terminated.

7. The method of claim 1, wherein the monitoring includes providing the administrator terminal with a function for remotely monitoring at least one user terminal participating in the online meeting.

8. The method of claim 7, wherein the providing includes providing each of the at least one user terminal with a dedicated interface for sharing screens or modifying a blocklist.

9. The method of claim 1, wherein the determining includes:
   providing a dedicated interface for editing a blocklist when limited access is allowed on the user terminal; and
   updating the blocklist to include a program registered through the dedicated interface.

10. The method of claim 4, wherein the determining includes, when there is a user's blocklist set up by the user terminal, replacing the user's blocklist with the administrator's blocklist.

11. The method of claim 1, wherein the terminating includes, once the packets are blocked or the internal process is terminated, sending information on the packets or the process to the administrator terminal.

12. The method of claim 1, further comprising, upon detecting termination of the conferencing program, generating a disable event for disabling the disruption factor blocking function.

13. An apparatus for providing an online meeting, capable of detecting an online meeting and blocking disruption factors, the apparatus comprising:
   a meeting detection part for detecting execution of a conferencing program for an online meeting on a user terminal;
   an event generation part for, upon detecting execution of the conferencing program, generating a monitoring event to enable a disruption factor blocking function;
   a monitoring part for monitoring packets transmitted and received by the user terminal and an internal process running on the same, in response to the monitoring event;
   an access determination part for determining whether to allow the transmitted and received packets and the internal process based on a preset blocklist; and
   a blocking control part for blocking the transmitted and received packets or terminating the internal process, based on the determination.

14. The apparatus of claim 13, further comprising a remote control part for, when a meeting detection and disruption factor blocking function is running on a first user terminal, providing a second user terminal, which is registered in relation to the first user terminal, with a remote control function in regard to the meeting detection and disruption factor blocking function.

* * * * *